US011228568B1

(12) United States Patent
Dey et al.

(10) Patent No.: US 11,228,568 B1
(45) Date of Patent: Jan. 18, 2022

(54) ANONYMIZATION OF USER DATA FOR PRIVACY ACROSS DISTRIBUTED COMPUTING SYSTEMS

(71) Applicant: Amazon Technologies, Inc., Seattle, WA (US)

(72) Inventors: Atreyee Dey, Bangalore (IN); Debasish Das, Bangalore (IN); Gaurav Bhatnagar, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 524 days.

(21) Appl. No.: 16/206,721

(22) Filed: Nov. 30, 2018

(51) Int. Cl.
*H04L 29/06* (2006.01)
*G06F 16/9538* (2019.01)
*G06F 16/9535* (2019.01)

(52) U.S. Cl.
CPC ...... *H04L 63/0421* (2013.01); *G06F 16/9535* (2019.01); *G06F 16/9538* (2019.01)

(58) Field of Classification Search
CPC .................................................. H04L 63/0421
See application file for complete search history.

(56) References Cited

U.S. PATENT DOCUMENTS

| 6,023,510 A * | 2/2000 | Epstein | G06Q 20/383 380/285 |
| 9,635,421 B2 * | 4/2017 | Tidwell | H04N 21/23109 |
| 2004/0064568 A1 * | 4/2004 | Arora | H04L 67/1059 709/228 |
| 2016/0239569 A1 * | 8/2016 | Levy | G06F 16/951 |
| 2019/0012480 A1 * | 1/2019 | Thorwirth | G06Q 30/02 |

* cited by examiner

*Primary Examiner* — William S Powers
(74) *Attorney, Agent, or Firm* — Eversheds Sutherland (US) LLP (57) ABSTRACT

Systems, methods, and computer-readable media are disclosed for systems and methods for anonymization of user data for privacy across distributed computing systems. Example methods may include determining, by a first computer system, a request for content to present at a user device, wherein the request for content is associated with a user account, determining a first search query associated with the user account, and determining a first keyword associated with the first search query. Some methods may include generating a first hash value for the first keyword, sending the first hash value to a second computer system for identification of first content for presentation at the user device, and causing the second computer system to send the first content to the user device for presentation, wherein the first computer system does not receive the first content.

20 Claims, 6 Drawing Sheets

ANONYMIZATION OF USER DATA FOR PRIVACY ACROSS DISTRIBUTED COMPUTING SYSTEMS

BACKGROUND

Digital content, such as images, videos, text, and other content, may be presented to users at electronic devices. Certain content may be targeted for presentation to certain users. For example, sports themed content may be presented to users that enjoy consuming sports themed content. However, users may desire privacy in addition to consuming content of interest. Accordingly, determining content of interest to users while maintaining user privacy may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

In the context of digital content, certain digital content may be delivered for presentation (e.g., rendering) at a user interface of, for example, a mobile application executing on a device. Presentation of the digital content at a digital content slot may be referred to as serving an impression. Certain digital content may be targeted to certain users or types of users. For example, certain content may be relevant to users interested in sports and active wear, while other content may be relevant to users interested in restaurants and cooking. Accordingly, content presented to users may be less effective if the user to whom the content is presented is disinterested in the content.

Determining whether a user may be interested in certain content may be difficult because the user may desire privacy with respect to the user's preferences and/or interests. Embodiments of the disclosure safeguard user privacy by anonymizing user-specific data, while also allowing for relevant content to be presented to users who opt in to (and/or users that do not opt out of) behavior targeting functionality. Certain embodiments may segment audiences in or near real-time for displaying relevant content to users, thereby ensuring user data privacy. As a result, content creators may present content to potentially interested audiences of users, while users maintain privacy as users cannot be specifically identified, or even generally identified (e.g., demographics, geographic region, etc.), in some instances.

Embodiments of the disclosure protect user privacy by determining general keywords associated with search queries that may be input by users. For example, a user may complete a search query of "size 32 men's athletic pants," which may be associated with a general keyword of "men's pants." The general keywords may be anonymized using, in one example, a hashing algorithm for one-way hashing, to generate an anonymized keyword. The anonymized keyword may then be sent to a different processing system, such as a different computer system, to determine content that is associated with the anonymized keyword. In some embodiments, the content may be selected from pre-matched or pre-associated content and anonymized keywords that are stored in cache memory for reduced latency. The second processing system, which may be a second computer system in some instances, may facilitate delivery of the selected content to a user device for presentation. As a result, no single processing system may have access to a user account identifier, user-specific search queries, anonymized keywords, and associated content. Therefore, multiple processing or computer systems would have to be compromised in order to gain access to user-specific information for content targeting purposes. In addition, the association between queries (or keywords) and content may not be stored at a single processing system, and the association of user accounts and queries may not be stored at a single processing system in some embodiments.

This disclosure relates to, among other things, devices, systems, methods, computer-readable media, techniques, and methodologies for anonymization of user data for privacy across distributed computing systems. Certain embodiments may increase efficiency and performance associated with selection, delivery, and performance of digital content. Using machine learning, some embodiments may automatically anonymize data using hashing functions. Certain embodiments may use machine learning to select content for presentation in or near real-time, and to segment audiences for presentation of content.

Figure 1:
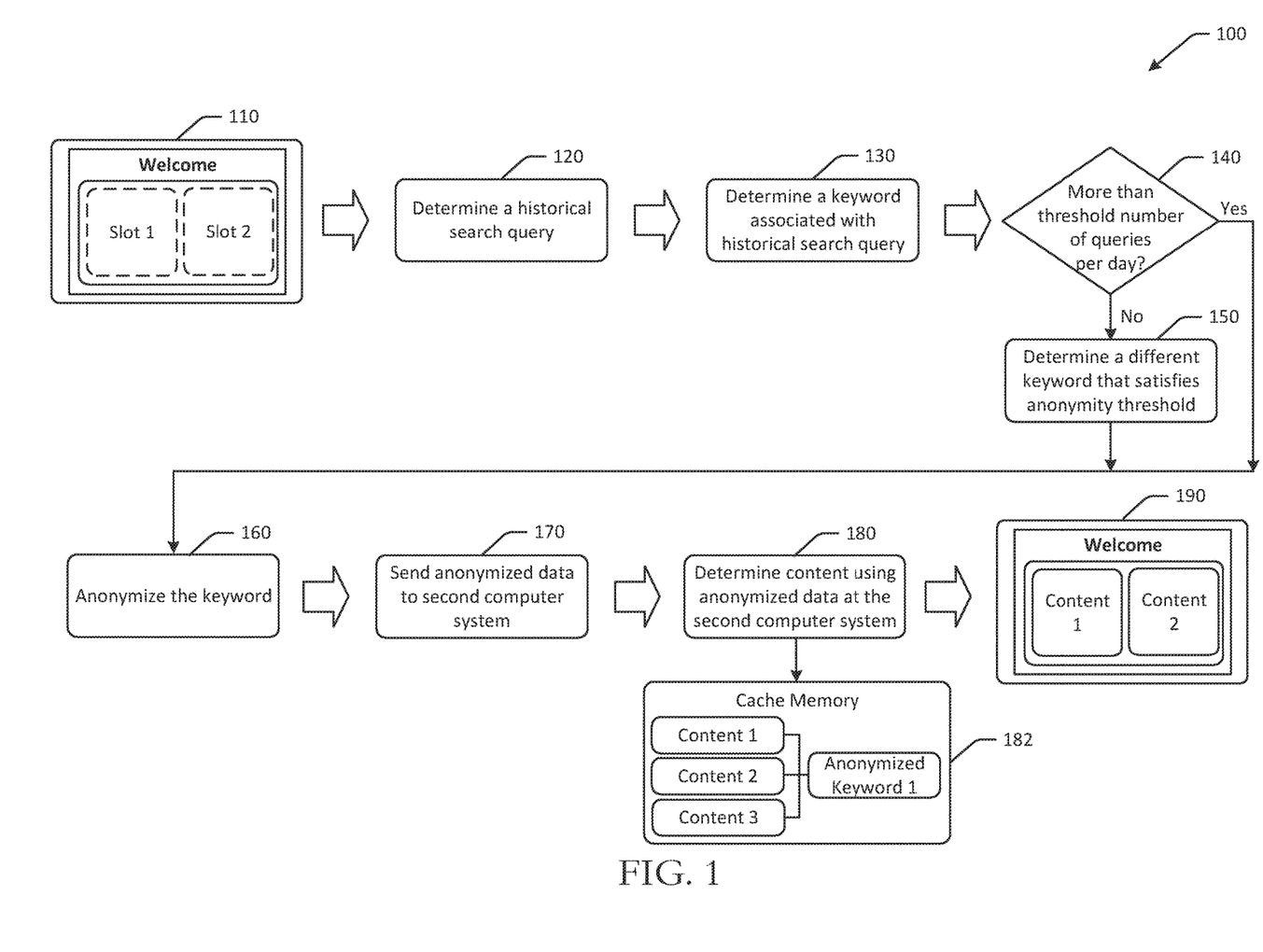
FIG. 1 is a schematic hybrid illustration of an example use case and process flow for anonymization of user data for privacy across distributed computing systems in accordance with one or more example embodiments of the disclosure.

Referring to FIG. 1, an example use case 100 for anonymization of user data for privacy across distributed computing systems is depicted in accordance with one or more example embodiments of the disclosure. In FIG. 1, a user may be using a user device 110. The user may access a mobile application at the user device 110, such as a browser application, a shopping application, or another application. The mobile application may include a user interface. The user interface may include a widget or user interface element that includes one or more content slots at which content, such as images, videos, etc. may be presented. In the example of FIG. 1, the user interface may include two content slots, illustrated as slot 1 and slot 2. The user interface element may send a request for content to fill the content slots to one or more remote servers, such as a first remote server. The first remote server and/or computer system may include at least one memory that stores computer-executable instructions and at least one processor configured to access the at least one memory and execute the computer-executable instructions to perform various actions or operations, such as one or more of the operations of FIG. 1.

The first remote server may receive the request for content to present at the user interface of the mobile application. The first remote server may not have content locally stored or otherwise accessible at the first remote server. The content may be stored at a separate remote server or computing system, such as a second remote server. To determine content to present in the content slots at the user interface, the first remote server may determine a user account associated with the request. For example, the request for content may be associated with a session identifier and/or a user account identifier that may be indicative of a user that is using the user device 110.

At a first operation 120, the first remote server may determine a historical search query. For example, the first remote server may determine one or more historical search queries associated with the session identifier and/or user account identifier. The historical search queries may be determined using a certain time interval, such as the preceding 24 hours or 1 week, etc., as relatively more recent search queries may be indicative of a browse intent of the user. For example, if the user recently searched for a football jersey, the user may still be interested in football jerseys, as opposed to content related to a search the user performed 90 days earlier. In the example of FIG. 1, the first remote server may determine that the user account is associated with a last completed search query of "brand X men's sweater size medium."

At a second operation 130, the first remote server may determine a keyword or keywords associated with the historical search query. The keyword may be a generalized term that is associated with the search query. Because the keyword may be generalized, the keyword may not be used to pinpoint a specific user or group of users. For example, the keyword associated with the historical search query of "brand X men's sweater size medium" may be "men's sweater." Accordingly, the size and brand included in the search query may not be included, and as a result, third parties may be unable to identify the user account associated with the search query. In some embodiments, the keyword may be a product category associated with a product identifier. For example, if the search query includes a product identifier, such as "brand X men's sweater size medium," the associated keyword may be "men's sweater" or "sweater." In some embodiments, the associated keyword may be determined in real-time, while in other embodiments, the associated keyword may be determined using a pre-associated set of queries and keyword(s).

At determination block 140, the first remote server may determine whether there are more than a threshold number of queries associated with the keyword per day. For example, the keyword may be associated with multiple search queries. In the example of FIG. 1, the keyword of "men's sweater" may be associated with search queries of "brand Y sweater," "boys sweater size L," "men's black sweater," and so forth. The first remote server may determine a number of search queries associated with the keyword that are completed within a particular time interval, such as one day, or a 24 hour period, or another time interval. The number of search queries may indirectly indicate how many users are searching for queries associated with the keyword. This may indicate whether the keyword is sufficiently anonymous. For example, if there are only 25 search queries per day related to the keyword, then the keyword may not be sufficiently anonymous, as a third party could determine that a group of maximum 25 user accounts completed the search queries. The threshold may be a anonymity threshold and may be, for example, 10,000 search queries. In some embodiments, the anonymity threshold may be dynamic based at least in part on a day of the week (e.g., certain days may have heavier search query traffic than others, etc.), while in other embodiments, the anonymity threshold may be a static value, such as 25,000 queries. The higher the anonymity threshold, the increased anonymity for users performing the search queries.

In some embodiments, instead of, or in addition to, determining whether there are a threshold number queries associated with the keyword during a certain time interval, the first remote server may determine a number of user accounts that completed search queries associated with the keyword. For example, some users may perform multiple similar search queries that are associated with the same keyword. Accordingly, some embodiments may determine whether the number of user accounts that completed search queries associated with a particular keyword is greater than or equal to a number of users threshold.

If the first remote server determines, at determination block 140, that the number of queries is not greater than the anonymity threshold, and/or that the number of user accounts performing search queries is not greater than the number of users threshold, the first remote server may determine a different keyword that satisfies the anonymity threshold at a third operation 150. For example, if "men's sweater" does not satisfy the anonymity threshold, the first remote server may determine a keyword of "sweater," as there may have been presumably more search queries associated with "sweater," than "men's sweater" (e.g., female sweater search queries may be associated with a keyword of "sweater" as well, etc.). To determine a different keyword, the first remote server may use a browse node hierarchy (e.g., a structure of products, product categories, etc. in increasingly broad terms, etc.) in some embodiments. In other embodiments, the first remote server may delete terms from search queries until the anonymity threshold is satisfied. The first remote server may then proceed to a fourth operation 160.

If the first remote server determines, at determination block 140, that the number of queries is greater than or equal to the anonymity threshold, or after completing the third operation 150, the first remote server may anonymize the keyword(s) at a fourth operation 160. To anonymize the keyword, the first remote server may generate a one-way hash of the keyword(s) using one or more hashing algorithms. In some instances, anonymization may be completed by hashing algorithms, cryptography, encryption, and/or a different anonymization process.

At a fifth operation 170, the first remote server may send the anonymized data to a second computer system, such as a second remote server. The anonymized data may include the anonymized keyword, and may optionally include session identification data or other device-related data to facilitate delivery of content to the device 110.

At a sixth operation 180, the second remote server may determine content for presentation at the user device using the anonymized data. To determine the content for presentation, the second remote server may, in one embodiment, access cache memory 182. The cache memory may store candidate content identifiers of candidate content in association with anonymized keywords. The cache memory 182 may be periodically updated, so as to ensure that content associations are accurate and current. For example, the cache memory 182 may be updated daily. Because the candidate content identifiers may be stored in association with anonymized keywords, the second computer system may not be able to determine which keywords are associated with which content identifiers. In addition, because more than one content identifier may be associated with the same anonymized keyword, more than one of the candidate content identifiers can be selected for presentation in instances where a user performs multiple search queries associated with the keyword, or where more than one content slot is available, such as at the widget in the example of FIG. 1. To determine the content for presentation, the second remote server may determine which content identifiers are candidates for presentation based at least in part on association with the anonymized keyword. Based at least in part on the identified candidates, the second remote server may select one or more of the candidates for presentation at the user device.

For example, in FIG. 1, the second remote server may select Content 1 and Content 2 for presentation at the user device. In some embodiments, the second remote server may send the content identifiers for Content 1 and Content 2 to the first remote server, and the first remote server may cause delivery of the respective content to the user device. In other instances, the second remote server may facilitate delivery of the content to the user device. As illustrated at user interface 190, the user device may render Content 1 and Content 2 at the respective content slots available at the widget. The content may therefore be presented at a widget on a mobile application user interface rendered at the user device. Because the second remote server is unable to determine the specific user associated with the search query and/or associated with the device at which the content is presented, the user's privacy may be protected, and the content selected for presentation may be relevant to the user.

In some embodiments, certain search queries may be protected from any access and may not be anonymized. For example, search queries related to health related conditions, pharmaceutical products, sexually explicit content, race, ethnicity, or religious affiliation, children, political affiliation, and/or other types of queries may be exempt from any form of anonymization for targeted content. In some embodiments, no computer system will store or have access to a mapping from a session identifier to a search query, and from a query to content identifiers. In some embodiments, no third party system may have a mapping between queries and user accounts. As a result, the content slots may be filled with content that may be relevant to the user, without sharing specific search query data for a user.

Example embodiments of the disclosure provide a number of technical features or technical effects. For example, in accordance with example embodiments of the disclosure, certain embodiments of the disclosure may perform one or more actions across a distributed computing environment where particular computer systems are prevented from accessing or storing certain data. Certain embodiments may generate anonymized data, which may include, in one example, one-way hashing, that can be used to identify associated content. Embodiments of the disclosure may improve computing efficiency and bandwidth by reducing an amount of data for querying, reducing manual inputs, and increasing speed of processing. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
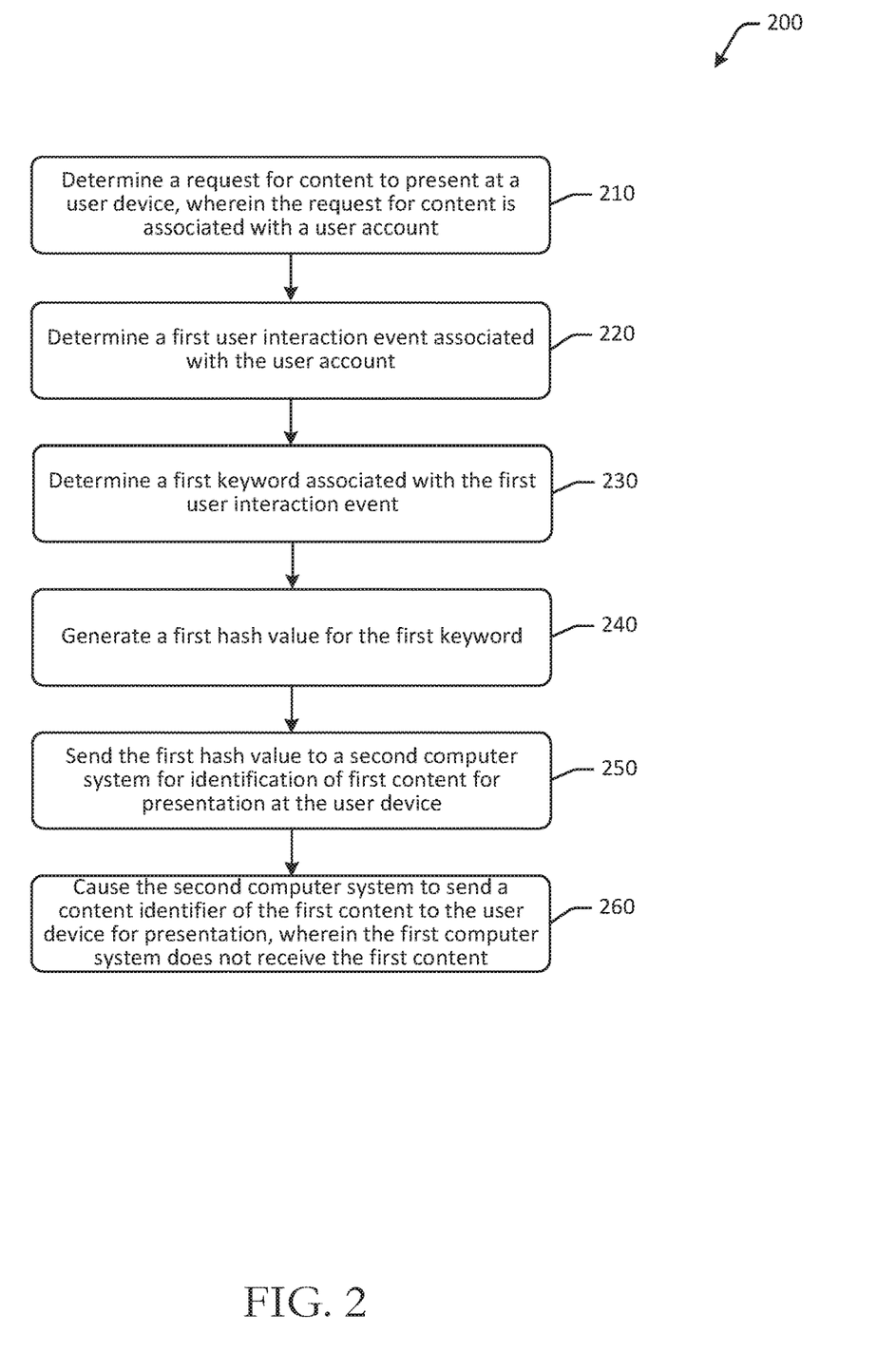
FIG. 2 is a schematic illustration of an example process flow for anonymization of user data for privacy across distributed computing systems in accordance with one or more example embodiments of the disclosure.

FIG. 2 is a schematic illustration of an example process flow 200 for anonymization of user data for privacy across distributed computing systems in accordance with one or more example embodiments of the disclosure. While example embodiments of the disclosure may be described in the context of digital content, it should be appreciated that the disclosure is more broadly applicable to any type of data. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine a request for content to present at a user device, wherein the request for content is associated with a user account. For example, one or more content delivery modules at a first computer system, such as a remote server, may determine a request for content to present at a user device. The request may be for content to present at a user interface of, for example, a mobile application. In some embodiments, the request may be for content to present at a widget of a mobile application user interface. The request may be associated with a session identifier, a user account identifier, and/or a different identifier associated with a device or user account.

At block 220 of the process flow 200, computer-executable instructions stored on a memory of a device, such as a remote server or a user device, may be executed to determine a first user interaction event associated with the user account. The first user interaction event may be, for example, a search query, text of a review or comment posted by the user account, product pages visited by the user account, and/or other user interactions. For example, one or more keyword generation/mapping modules at the first computer system may be executed to determine a first search query associated with the user account. The first search query may be a historical search query and may have been completed with a certain time interval and/or using a particular service. For example, the search query may have been a last completed search query, or may have been completed within the past 48 hours. The first search query may have been completed or input at a particular mobile application or website in some instances. In one example, the first computer system may determine a first search query performed by a user account during a time interval at a search engine. The first search query may include a first product identifier.

At block 230 of the process flow 200, computer-executable instructions stored on a memory of a device, such as a remote server or a user device, may be executed to determine a first keyword associated with the first user interaction event. For example, one or more keyword generation/mapping modules at the first computer system may be executed to determine a first keyword associated with the first user interaction event. The first keyword may be broader or more general than, in one example, a first search query. In some embodiments, the first keyword may be associated with the first search query. In some instances, such as when the first search query is for a product identifier, the first keyword may be a product category associated with the product identifier. In other instances, the first keyword may be dynamically generated based at least in part on modifications to the first search query. For example, certain words or terms may be deleted from the first search query to generalize the search query. In one example, if the first search query includes a first product identifier, the first computer system may determine a first product category identifier of the first product identifier for the keyword.

In some embodiments, keywords may be whitelisted or approved. Approved keywords may be keywords that are associated with search queries that are completed a certain number of times over a time interval, such as a certain number of times per day. The number of times may be compared against an anonymity threshold. For example, an approved keyword may be a keyword associated with search queries that are completed at least 10,000 times per day, where the anonymity threshold is 10,000 queries per day. This may increase anonymity for users performing the search queries. In some instances, a number of users that search for queries associated with a keyword may be used instead of, or in addition to, the anonymity threshold. For example, rather than 10,000 search queries associated with the keyword, 10,000 users may have to search for queries associated with the keyword in order to satisfy a number of users threshold.

At block 240 of the process flow 200, computer-executable instructions stored on a memory of a device, such as a remote server or a user device, may be executed to generate a first hash value for the first keyword. For example, one or more anonymization modules at the first computer system may be executed to determine a first hash value for the first keyword. The first hash value may be generated using, in one example, a one-way hashing algorithm. The output of the hashing algorithm may be the first hash value. The first hash value may not be unhashed or otherwise decoded by a different computer system in some embodiments. In one example, the first computer system may determine a one-way hash value of the first product category identifier in an instance where the keyword is the first product category identifier.

At block 250 of the process flow 200, computer-executable instructions stored on a memory of a device, such as a remote server or a user device, may be executed to send the first hash value to a second computer system for identification of first content for presentation at the user device. For example, one or more communication modules at the first computer system may be executed to send the first hash value to a second computer system, such as a second remote server, for identification of first content that is to be presented at the user device. In some embodiments, the first computer system may send a request for a set of candidate content identifiers that is associated with the first product category identifier (in anonymized form) to the second computer system. The first product category identifier (in un-anonymized form) may not be stored or accessible by the second computer system in some embodiments.

The second computer system may receive the first hash value and may use the first hash value to determine or identify candidate content identifiers for content associated with the hashed or otherwise anonymized keyword. The second computer system may determine one or more of the candidate content identifiers associated with the anonymized keyword for presentation at the user device. The second computer system may not have the un-anonymized keyword or search query data. In some embodiments, the second computer system may determine the set of candidate content identifiers associated with the anonymized keyword, where the set of candidate content identifiers includes a first candidate content identifier.

At block 260 of the process flow 200, computer-executable instructions stored on a memory of a device, such as a remote server or a user device, may be executed to cause the second computer system to send a content identifier of the first content to the user device for presentation, wherein the first computer system does not receive the first content. For example, one or more modules stored at the second computer system may be executed to send the first content and/or the determined content identifier for the first content to the user device for presentation at a user interface. The second computer system may facilitate delivery of the content to the user device in some embodiments. For example, the second computer system may send the content identifier of the first content to the user device, and the user device may request and/or obtain the first content from the second computer system or a different computer system and/or datastore.

In other embodiments, the second computer system may send the selected or determined content identifier to the first computer system, and the first computer system may send the content identifiers to the user device for presentation. For example, one or more content delivery modules at the first computer system may be executed to determine the content identifiers from the second computer system, and to send the content identifiers or content to the user device for presentation.

In certain embodiments, both the first search query and the first candidate content identifier may not be stored together at either the first computer system or the second computer system. In certain embodiments, both the user account and the second search query may not be stored together at either the first computer system or the second computer system. Similarly, in some embodiment, the mapping or association of queries (or keywords) and content identifiers may not be stored together at either the first computer system or the second computer system, and the mapping or association of queries (or keywords) and anonymized queries (or anonymized keywords) may not be stored together at either the first computer system or the second computer system.

Figure 3:
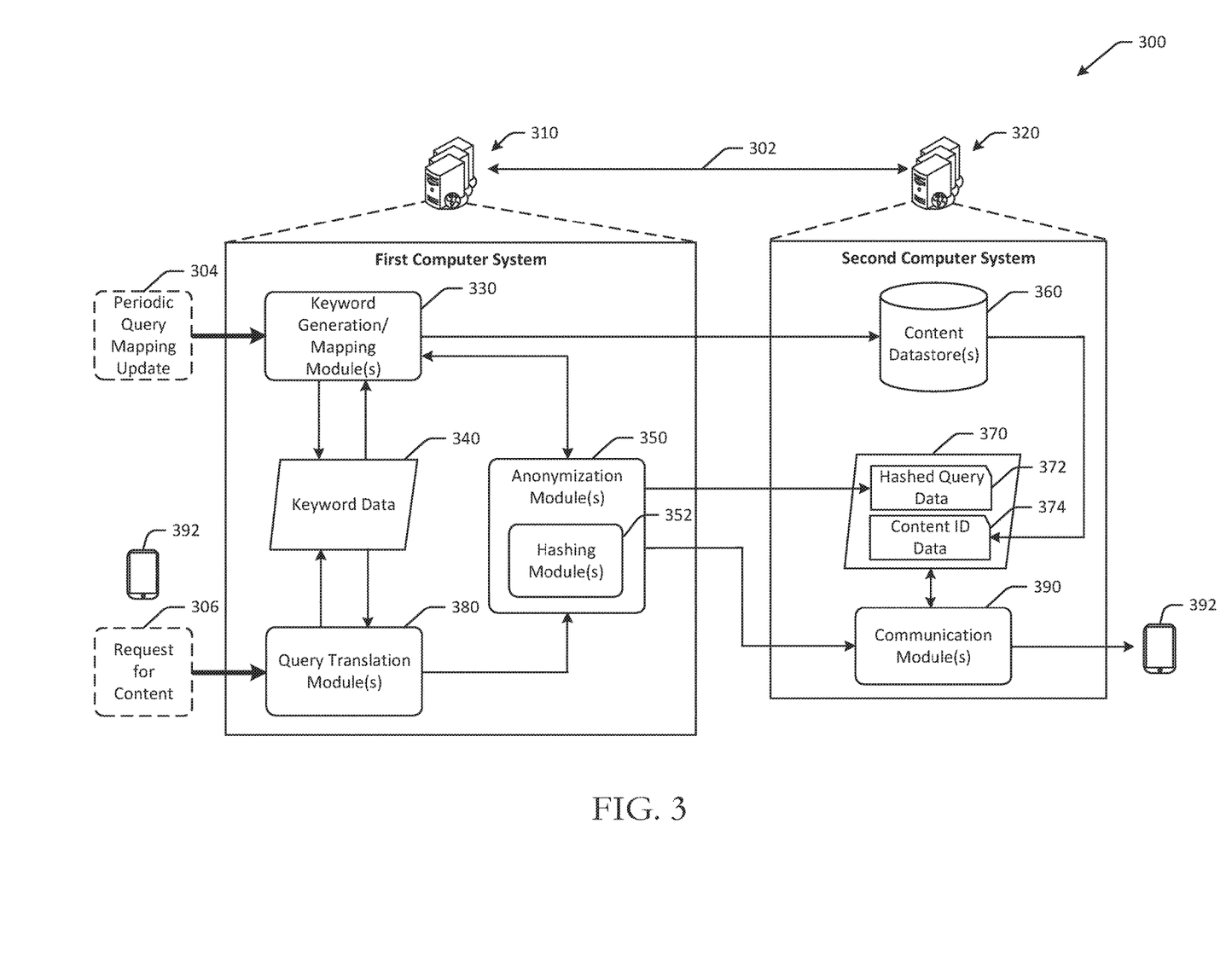
FIG. 3 is a schematic illustration of an example architecture and data flow for anonymization of user data for privacy across distributed computing systems in accordance with one or more example embodiments of the disclosure.

FIG. 3 is a schematic illustration of an example architecture and data flow 300 for anonymization of user data for privacy across distributed computing systems in accordance with one or more example embodiments of the disclosure. Different embodiments may include different, additional, or fewer components than those illustrated in the example of FIG. 3.

In FIG. 3, a first computer system 310 may be in communication with a second computer system 320 via one or more wired or wireless networks 302. The first computer system 310 and the second computer system 320 may be discrete computer systems. Certain data and/or components of the respective first computer system 310 and the second computer system 320 may not be accessible to each other. For example, the first computer system 310 may not be able to access memory of the second computer system 320, and/or the second computer system 320 may not be able to access memory of the first computer system 310. In some embodiments, one or more remote servers may form the first computer system 310, and one or more remote servers may form the second computer system 320. In some instances, the second computer system 320 may be controlled by the first computer system 310.

Some embodiments may include a background process 304 that may be executed after certain time intervals or periodically. The background process 304 may include periodic query mapping updates. The periodic query mapping updates may include determining an updated mapping between search queries and keywords, and/or between keywords and candidate content. For example, keywords may be updated over time as search queries may change (e.g., due to season, local events, popularity, etc.).

To determine query to keyword associations or mapping, the first computer system 310 may execute one or more keyword generation/mapping modules 330. The keyword generation/mapping modules 330 may be configured to determine or generate one or more keywords for a set of search queries. The set of search queries may be, for example, product identifiers in a product catalog, and the keywords may be product categories of the product identifiers. The keyword generation/mapping modules 330 may retrieve keywords from keyword data 340. The keyword data 340 may include manually approved or otherwise whitelisted keywords that can be used for mapping. In some embodiments, the keyword data 340 may include keywords that have a sufficiently high search frequency to satisfy an anonymity threshold or number of users threshold. For example, the keyword generation/mapping modules 330 may determine a total number of user accounts that completed search queries associated with a keyword during a time interval, and may determine that the total number of user accounts satisfies (e.g., meets or exceeds, etc.) an anonymity threshold.

The determined keywords may be sent from the first computer system 310 to the second computer system 320. For example, the keyword generation/mapping modules 330 may send the determined keywords to a content datastore 360 at the second computer system 320. The content datastore 360 may include indicators of available content for presentation and optional targeting data. The second computer system 320 may use the determined keywords to identify candidate content identifiers associated with the determined keywords. For example, the second computer system 320 may determine, using the content datastore 360, active content campaigns, and may determine whether the targeting criteria associated with the respective active content campaigns is satisfied by any of the determined keywords. The content identifiers associated with the determined keywords may be sent from the content datastore 360 to cache memory 370 at the second computer system 320 for storage as content identifier data 374. The determined keywords may then be deleted by the second computer system 320. In some embodiments, the second computer system 320 may determine content identifiers for content that has an automated targeting setting activated, as opposed to content that is associated with particular keywords. For example, the second computer system 320 may determine that targeting criteria for the first candidate content does not include keywords, or that the content is auto-targeted.

The first computer system 310 may generate an anonymized version of the determined keywords. For example, the keyword generation/mapping modules 330 may send the determined keywords to one or more anonymization modules 350 for anonymization of the determined keywords. The anonymization module 350 may include one or more hashing modules 352, which may be used to determine a one-way hashing value of the one or more determined keywords. The output of the anonymization module 350, which may be a hash value, may be sent to the second computer system 320 for storage in the cache memory as hashed query data 372. The hashed query data 372 may be stored in association with the respective content identifier data 374. Accordingly, the second computer system 320 may store anonymized keyword data (e.g., one-way hash value, etc.) in association with the respective content identifier data (e.g., set of candidate content identifiers, etc.) in the cache memory 370. The second computer system 320, if compromised, may not be used to determine specific keywords or any user-specific data.

The background process 304 may therefore be complete. The background process 304 may be repeated to update content that is available for presentation, whitelisted keyword data, and so forth.

As user devices access certain content, such as a mobile application that has a widget or other user interface space designated for presentation of content, the first computer system 310 may receive optional requests for content 306. The request for content 306 may be for content for presentation at the designated locations at a user interface of a mobile device 392. The request for content 306 may include a session identifier and/or user account identifier. The first computer system 310 may receive the request for content at one or more query translation modules 380. The query translation module 380 may determine one or more historical queries associated with the user account. The query translation module 380 may determine, using the keyword data 340, a keyword associated with the historical query. The query translation module 380 may send the determined keyword to the anonymization modules 350 and/or the hashing module 352 for anonymization. The first computer system 310 may then send the anonymized keyword to one or more communication modules 390 at the second computer system 320. The second computer system 320 may receive the anonymized keyword from the anonymization module 350, and may query (e.g., use a key value lookup, etc.) the cache memory 370 to determine the candidate content identifiers associated with the anonymized keyword (e.g., that were loaded into the cache memory during the background process 304. The communication module 390 may determine one or more of the candidate content identifiers for presentation and may facilitate delivery of the determined candidate content identifiers to a mobile device 392, which may be the mobile device from which the request for content 306 was received. Accordingly, the search query may not be sent to second computer system 320 during the request for content process, and the first keyword may not be sent to second computer system 320 during the request for content process. In some embodiments, both the first search query and the first candidate content are not stored together at either the first computer system or the second computer system, and both the user account and the first candidate content are not stored together at either the first computer system or the second computer system.

Figure 4:
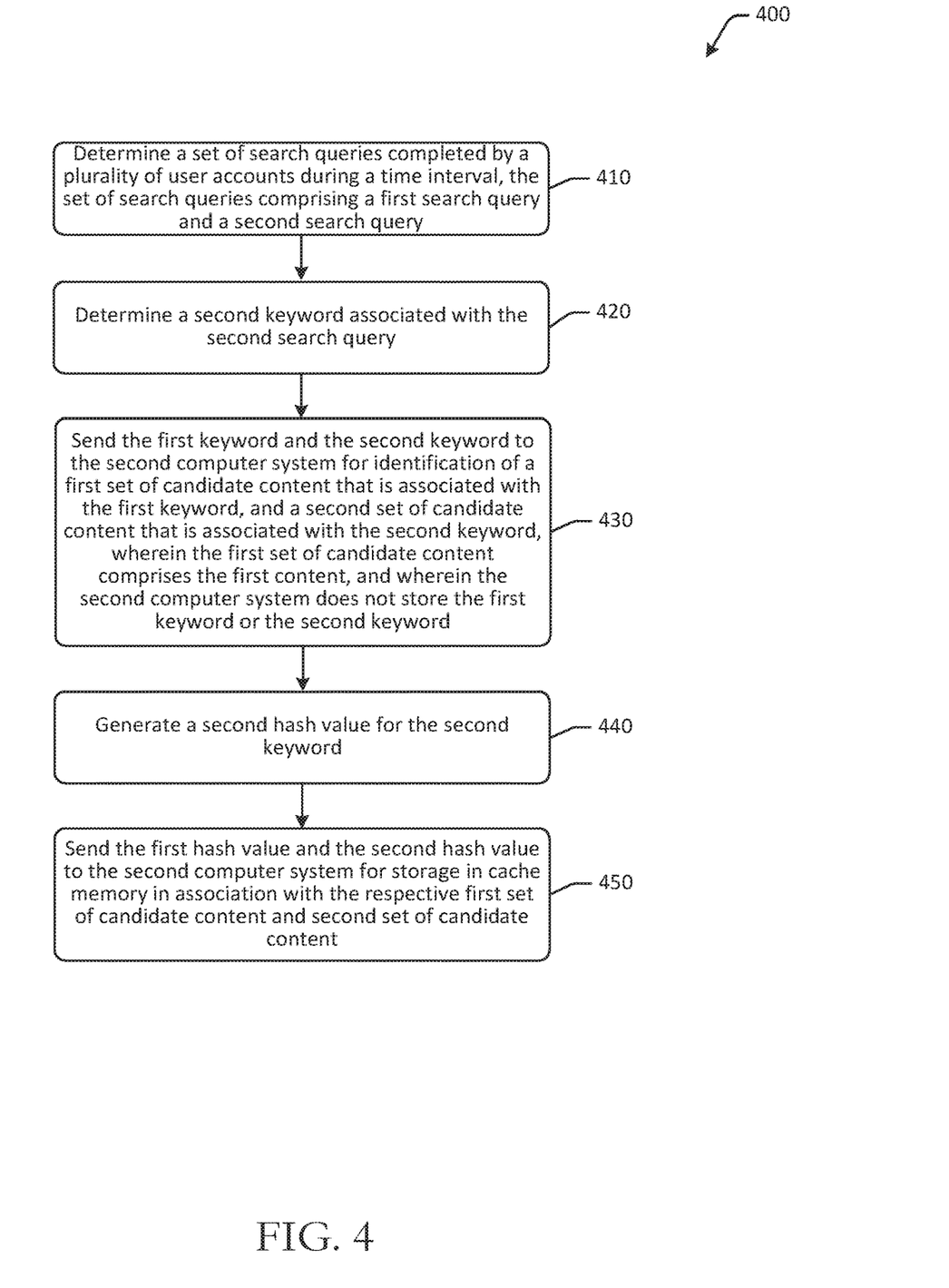
FIG. 4 is a schematic illustration of an example process flow for anonymization of user data for privacy across distributed computing systems in accordance with one or more example embodiments of the disclosure.

FIG. 4 is a schematic illustration of an example process flow 400 for anonymization of user data for privacy across distributed computing systems in accordance with one or more example embodiments of the disclosure. While example embodiments of the disclosure may be described in the context of digital content, it should be appreciated that the disclosure is more broadly applicable to any type of data. Some or all of the blocks of the process flows in this disclosure may be performed in a distributed manner across any number of devices. The operations of the process flow 400 may be optional and may be performed in a different order. The process flow 400 may be the background process discussed with respect to FIG. 3.

At block 410 of the process flow 400, computer-executable instructions stored on a memory of a device, such as a remote server or a user device, may be executed to determine a set of search queries completed by a plurality of user accounts during a time interval, the set of search queries comprising a first search query and a second search query. For example, one or more modules at a first computer system, such as a first remote server, may determine a set of search queries completed by one or more user accounts during a time interval. The first computer system may determine the set of search queries in order to determine a set of sufficiently anonymous keywords, so as to improve user privacy. For example, keywords that are not sufficiently anonymous, as determined using an anonymity threshold, may not be whitelisted as user identification may be possible.

At block 420 of the process flow 400, computer-executable instructions stored on a memory of a device, such as a remote server or a user device, may be executed to determine a second keyword associated with the second search query. For example, one or more modules at a first computer system, such as a first remote server, may determine a second keyword associated with the second search query in the set of search queries. In some instances, different search queries may be associated with the same keyword, while in other instances, different search queries may be associated with different keywords.

At block 420 of the process flow 400, computer-executable instructions stored on a memory of a device, such as a remote server or a user device, may be executed to send the first keyword and the second keyword to the second computer system for identification of a first set of candidate content that is associated with the first keyword, and a second set of candidate content that is associated with the second keyword, wherein the first set of candidate content comprises the first content, and wherein the second computer system does not store the first keyword or the second keyword. For example, one or more modules at a first computer system, such as a first remote server, may send the first keyword and the second keyword to the second computer system for identification of a first set of candidate content that is associated with the first keyword, and a second set of candidate content that is associated with the second keyword, wherein the first set of candidate content comprises the first content, and wherein the second computer system does not store the first keyword or the second keyword. The second computer system may identify the respective candidate content.

At block 440 of the process flow 400, computer-executable instructions stored on a memory of a device, such as a remote server or a user device, may be executed to generate a second hash value for the second keyword. For example, one or more modules at a first computer system, such as a first remote server, may generate a second hash value for the second keyword using one or more hashing algorithms.

At block 450 of the process flow 400, computer-executable instructions stored on a memory of a device, such as a remote server or a user device, may be executed to send the first hash value and the second hash value to the second computer system for storage in cache memory in association with the respective first set of candidate content and second set of candidate content. For example, one or more modules at a first computer system, such as a first remote server, may send the first hash value and the second hash value to the second computer system for storage in cache memory in association with the respective first set of candidate content and second set of candidate content. The second computer system may therefore store the hashed or anonymized keywords in association with the respective candidate content for use during subsequent requests for content for presentation at user devices.

Figure 5:
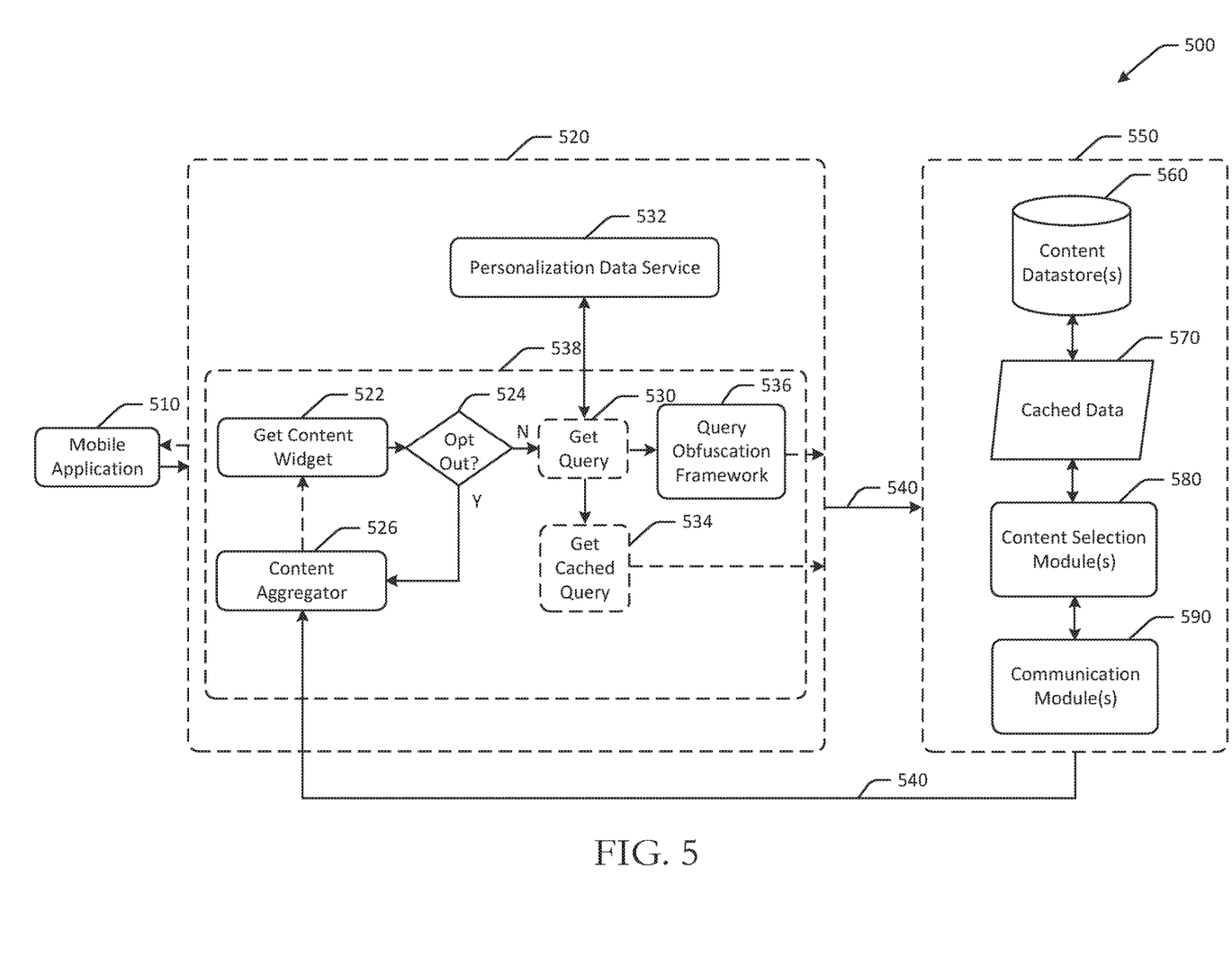
FIG. 5 is a schematic illustration of an example computer architecture to implement anonymization of user data for privacy across distributed computing systems in accordance with one or more example embodiments of the disclosure.

FIG. 5 is a schematic illustration of an example computer architecture 500 to implement anonymization of user data for privacy across distributed computing systems in accordance with one or more example embodiments of the disclosure. Different embodiments may include different, additional, or fewer components than those illustrated in the example of FIG. 5.

In FIG. 5, a mobile application 510, such as a browser application, may be executing on a user device. The mobile application 510 may send a request for content to be presented at a user interface of the device. The request may be received by a first computer system 520, which may be a retail remote server system. The request may be processed by a content processing service 538 at the first computer system 520. The content processing service 538 may include a get content widget 522 at the first computer system 520. The get content widget 522 may be configured to parse the request and determine content for presentation at the user interface of the mobile application 510. At determination block 524, a determination may be made as to whether the user account associated with the request has opted out of behavioral content targeting. If the determination at determination block 524 is positive, the content processing service 538 may execute a content aggregator 526, at which random content may be selected for presentation and returned to the get content widget 522. The get content widget 522 may facilitate delivery of the content to the mobile application 510.

If the determination at determination block 524 is negative, the content processing service 538 may execute an optional get query operation 530. The get query operation 530 may include determining historical search query data associated with the user account by querying a personalization data service 532. The personalization data service 532 may store historical user interaction data associated with user accounts, such as search query data. The content processing service 538 may obtain the search query data and may pass the data to a query obfuscation framework 536. The query obfuscation framework 536 may include one or more components configured to generate an anonymized keyword associated with the search query. The content processing service 538 may pass the search query data to a get cached query operation 534, at which the first computer system 520 may obtain the candidate content identifiers associated with the search query from a second computer system 550. In one example, the first computer system 520 may send a request for content to the second computer system 550. The communications 540 between the first computer system 520 and the second computer system 550, and the second computer system 550 and the mobile application 510, may include masked or anonymized behavioral data.

The second computer system 550 may receive the request for content, and may determine, using cached data 570, candidate content. For example, the second computer system 550 may include one or more content selection modules 580 and one or more communication modules 590. The content selection module 580 may query the cached data 570 to determine candidate content identifiers associated with anonymized search query data, and may select one or more of the candidate content identifiers for presentation at the mobile application 510. The communication module 590 may send the selected content to the content aggregator 526, which may facilitate presentation of an impression of the selected content at the mobile application 510.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
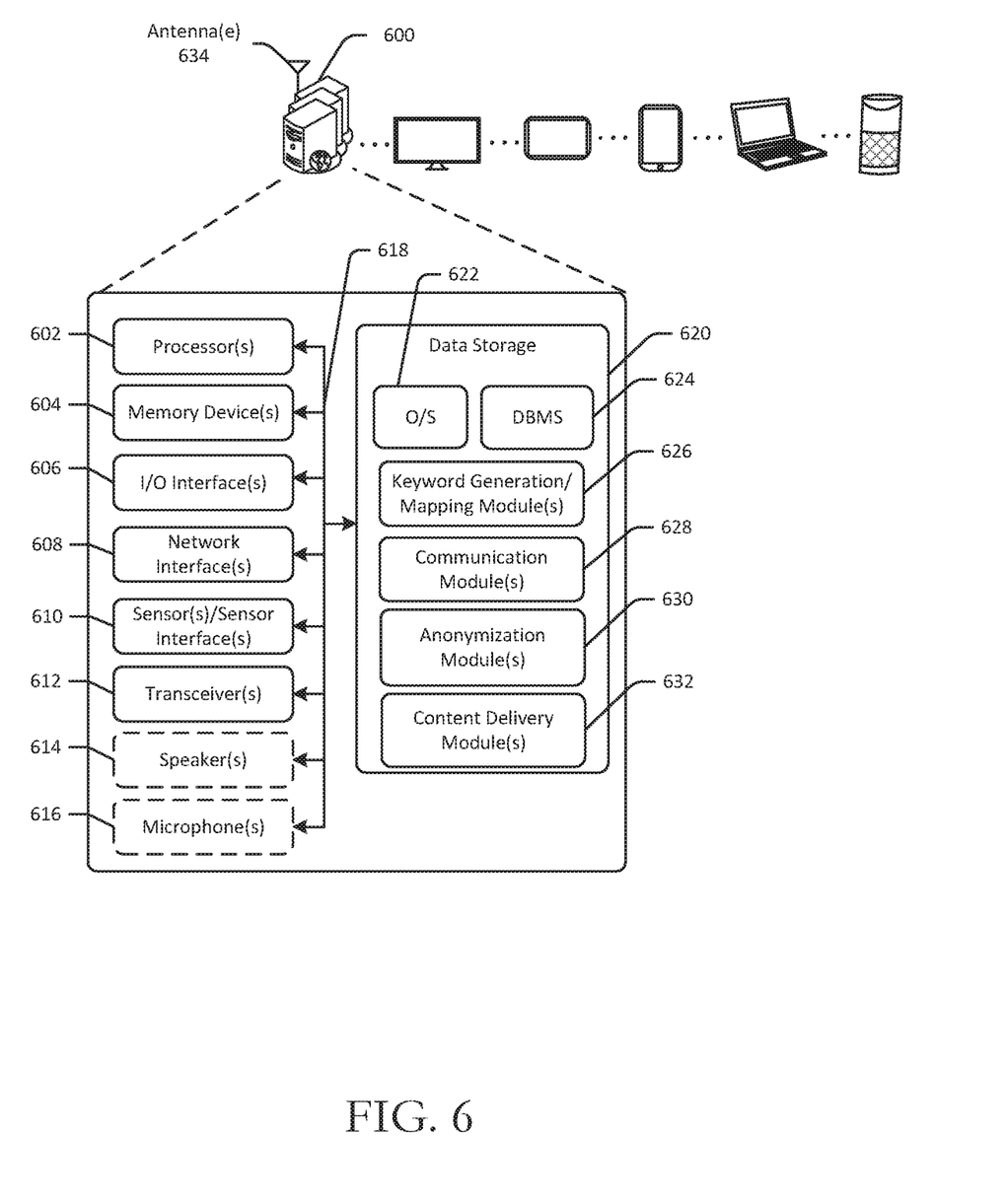
FIG. 6 is a schematic block diagram of an illustrative device in accordance with one or more example embodiments of the disclosure.

FIG. 6 is a schematic block diagram of an illustrative remote server 600 in accordance with one or more example embodiments of the disclosure. The remote server 600 may include any suitable computing device capable of receiving and/or sending data including, but not limited to, a server device, a mobile device such as a smartphone, tablet, e-reader, wearable device, or the like; a desktop computer; a laptop computer; a content streaming device; a set-top box; or the like. The remote server 600 may correspond to an illustrative device configuration for one or more of the computer systems of FIGS. 1-5. In some embodiments, a group or a fleet of servers may be configured to perform one or more operations in a distributed computing environment.

The remote server 600 may be configured to communicate via one or more networks with one or more servers, datastores, user devices, or the like. In some embodiments, a single remote server or single group of remote servers may be configured to perform more than one type of anonymization and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The remote server 600 may further include one or more buses 618 that functionally couple various components of the remote server 600. The remote server 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the remote server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the remote server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more keyword generation/mapping module(s) 626, one or more communication module(s) 628, one or more anonymization module(s) 630, and/or one or more content delivery module(s) 632. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the remote server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, historical interaction information, historical query information, user account information, and/or other information.

The processor(s) 602 may be configured to access the memory 604 and execute computer-executable instructions loaded therein. For example, the processor(s) 602 may be configured to execute computer-executable instructions of the various program module(s), applications, engines, or the like of the remote server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the keyword generation/mapping module(s) 626 may include computer-executable instructions, code, or the like that responsive to execution by one or more of the processor(s) 602 may perform functions including, but not limited to, determining one or more keywords, determining associations between search terms (and/or queries) and keywords, determining a number of searches for queries associated with certain keywords over a time interval, determining a number of users completing searches for queries associated with certain keywords over a time interval, determining product categories, determining browse node hierarchies, generating one or more machine learning models or algorithms, and the like.

The communication module(s) 628 may include computer-executable instructions, code, or the like that responsive to execution by one or more of the processor(s) 602 may perform functions including, but not limited to, communicating with one or more devices, for example, via wired or wireless communication, communicating with remote servers and/or user devices, communicating with remote datastores, sending or receiving notifications or commands/directives, communicating with cache memory data, communicating with user interfaces, and the like.

The anonymization module(s) 630 may include computer-executable instructions, code, or the like that responsive to execution by one or more of the processor(s) 602 may perform functions including, but not limited to, generating hash values, anonymizing data, generating character strings, extracting personally identifiable information, and the like.

The content delivery module(s) 632 may include computer-executable instructions, code, or the like that responsive to execution by one or more of the processor(s) 602 may perform functions including, but not limited to, determining content associated with certain queries or keywords, determining candidate content identifiers, selecting content for presentation, sending content or content identifiers to user devices, determining whether content was presented, logging user interactions with content, and the like.

Referring now to other illustrative components depicted as being stored in the data storage 620, the 0/S 622 may be loaded from the data storage 620 into the memory 604 and may provide an interface between other application software executing on the remote server 600 and hardware resources of the remote server 600. More specifically, the 0/S 622 may include a set of computer-executable instructions for managing hardware resources of the remote server 600 and for providing common services to other application programs (e.g., managing memory allocation among various application programs). In certain example embodiments, the 0/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 600 is a mobile device, the DBMS 624 may be any suitable light-weight DBMS optimized for performance on a mobile device.

Referring now to other illustrative components of the remote server 600, the input/output (I/O) interface(s) 606 may facilitate the receipt of input information by the remote server 600 from one or more I/O devices as well as the output of information from the remote server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 600 may further include one or more network interface(s) 608 via which the remote server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the remote server 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the remote server 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server 600 may include alternate and/or additional hardware, software, or firmware components beyond those described or depicted without departing from the scope of the disclosure. More particularly, it should be appreciated that software, firmware, or hardware components depicted as forming part of the remote server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:

determining, by a first computer system comprising one or more computer processors coupled to memory, a first search query performed during a time interval at a search engine, wherein the first search query comprises a first product identifier;

determining a first product category identifier of the first product identifier;

sending a request for a set of candidate content identifiers that is associated with the first product category identifier to a second computer system, wherein the first product category identifier is not stored by the second computer system;

determining, by the second computer system, the set of candidate content identifiers, wherein the set of candidate content identifiers comprises a first candidate content identifier;

determining a one-way hash value of the first product category identifier;

sending the one-way hash value to the second computer system;

storing, by the second computer system, the one-way hash value and the set of candidate content identifiers in cache memory;

receiving a request for content to present at a first user interface of a mobile application;

determining a user account associated with the request;

determining a second search query previously completed by the user account, the second search query comprising a second product identifier;

determining that a product category identifier of the second product identifier is the first product category identifier;

determining the one-way hash value of the first product category identifier;

sending a request for content to the second computer system, the request for content comprising the one-way hash value;

determining, by the second computer system and using the cache memory, that the first candidate content identifier is associated with the one-way hash value; and causing presentation of content associated with the first candidate content identifier at the first user interface of the mobile application.

2. The method of claim 1, further comprising:
determining, by the second computer system, that targeting criteria for the first candidate content identifier does not include keywords.

3. The method of claim 1, further comprising:
determining a total number of user accounts that completed search queries for product identifiers associated with the first product category identifier during the time interval; and
determining that the total number of user accounts satisfies an anonymity threshold.

4. The method of claim 1, wherein both the first search query and the first candidate content identifier are not stored together at either the first computer system or the second computer system, and wherein both the user account and the second search query are not stored together at either the first computer system or the second computer system.

5. A method comprising:
determining, by a first computer system comprising one or more computer processors coupled to memory, a request for content to present at a user device, wherein the request for content is associated with a user account;
determining a first user interaction event associated with the user account;
determining a first keyword associated with the first user interaction event;
generating a first hash value for the first keyword;
sending the first hash value to a second computer system for identification of first content for presentation at the user device; and
causing the second computer system to send the first content to the user device for presentation, wherein the first computer system does not receive the first content.

6. The method of claim 5, wherein the first user interaction event is a first search query, and wherein the first search query is not sent to second computer system, and the first keyword is not sent to second computer system.

7. The method of claim 5, wherein the first content is presented at a widget on a mobile application user interface rendered at the user device.

8. The method of claim 5, wherein the first user interaction event is a first search query, the method further comprising:
determining a set of search queries completed by a plurality of user accounts during a time interval, the set of search queries comprising the first search query and a second search query;
determining a second keyword associated with the second search query; and
sending the first keyword and the second keyword to the second computer system for identification of a first set of candidate content that is associated with the first keyword, and a second set of candidate content that is associated with the second keyword, wherein the first set of candidate content comprises the first content, and wherein the second computer system does not store the first keyword or the second keyword.

9. The method of claim 8, further comprising:
generating a second hash value for the second keyword; and
sending the first hash value and the second hash value to the second computer system for storage in cache memory in association with the respective first set of candidate content and second set of candidate content.

10. The method of claim 5, wherein the second computer system is controlled by the first computer system.

11. The method of claim 5, further comprising:
determining that targeting criteria for the first candidate content does not include keywords.

12. The method of claim 5, wherein both the first search query and the first candidate content are not stored together at either the first computer system or the second computer system, and wherein both the user account and the first candidate content are not stored together at either the first computer system or the second computer system.

13. The method of claim 5, further comprising:
determining a total number of user accounts that completed search queries associated with the first keyword during a time interval; and
determining that the total number of user accounts satisfies an anonymity threshold.

14. The method of claim 5, further comprising:
determining that the first user interaction event was completed within a time interval.

15. The method of claim 5, further comprising:
identifying, by the second computer system, the set of candidate content that is associated with the hash value using a key value lookup in cache memory.

16. A first computer system comprising:
memory configured to store computer-executable instructions; and
at least one computer processor configured to access the memory and execute the computer-executable instructions to:
determine a request for content to present at a user device, wherein the request for content is associated with a user account;
determine a first search query associated with the user account;
determine a first keyword associated with the first search query;
generate a first hash value for the first keyword;
send the first hash value to a second computer system for identification of first content for presentation at the user device; and
cause the second computer system to send the first content to the user device for presentation, wherein the first computer system does not receive the first content.

17. The first computer system of claim 16, wherein the at least one processor is further configured to access the memory and execute the computer-executable instructions to:
determine a set of search queries completed by a plurality of user accounts during a time interval, the set of search queries comprising the first search query and a second search query;
determine a second keyword associated with the second search query; and
send the first keyword and the second keyword to the second computer system for identification of a first set of candidate content that is associated with the first keyword, and a second set of candidate content that is associated with the second keyword, wherein the first set of candidate content comprises the first content, and wherein the second computer system does not store the first keyword or the second keyword.

18. The first computer system of claim 17, wherein the at least one processor is further configured to access the memory and execute the computer-executable instructions to:

generate a second hash value for the second keyword; and send the first hash value and the second hash value to the second computer system for storage in cache memory in association with the respective first set of candidate content and second set of candidate content.

19. The first computer system of claim 16, wherein the at least one processor is further configured to access the memory and execute the computer-executable instructions to:

determine a total number of user accounts that completed search queries associated with the first keyword during a time interval; and determine that the total number of user accounts satisfies an anonymity threshold.

20. The first computer system of claim 16, wherein both the first search query and the first candidate content are not stored together at either the first computer system or the second computer system, and wherein both the user account and the first candidate content are not stored together at either the first computer system or the second computer system.

* * * * *